United States Patent [19]

Szymborski et al.

[11] 4,401,730

[45] Aug. 30, 1983

[54] SEALED DEEP CYCLE LEAD ACID BATTERY

[75] Inventors: Joseph Szymborski, Bartlett; Sudhansu S. Misra, Hoffman Estates; Mark L. Eggers, Lake In The Hills; Brian W. Burrows, Rolling Meadows, all of Ill.

[73] Assignee: GNB Batteries Inc., Mendota Heights, Minn.

[21] Appl. No.: 304,475

[22] Filed: Sep. 22, 1981

Related U.S. Application Data

[63] Continuation-in-part of Ser. No. 193,568, Oct. 3, 1980, abandoned.

[51] Int. Cl.³ .............................................. H01M 2/12
[52] U.S. Cl. ..................................... 429/53; 429/226; 429/245
[58] Field of Search .................................. 429/53–56, 429/225–228, 247, 248, 251, 245

[56] References Cited

U.S. PATENT DOCUMENTS

| | | | |
|---|---|---|---|
| 3,553,020 | 1/1971 | Corbin et al. | 429/84 |
| 3,765,942 | 10/1973 | Jaibe | 429/225 X |
| 3,861,965 | 1/1975 | O'Sullivan | 429/53 |
| 3,862,861 | 1/1975 | McClelland et al. | 429/57 |
| 4,166,155 | 8/1979 | Mao et al. | 429/225 X |

Primary Examiner—Charles F. LeFevour
Attorney, Agent, or Firm—Augustus J. Hipp

[57] ABSTRACT

A maintenance-free, lead-acid cell that is capable of achieving long cycle life in deep discharge rapid recharge applications is sealed, has positive grids formed from antimony-lead alloys containing no more than about 2 wt. % of antimony, has negative grids formed from alloys that are essentially antimony-free, has highly porous, easily wetted separator material interposed between the plates which is capable of wicking the electrolyte, and provides a sufficient void volume to facilitate gaseous oxygen transport, and has the electrolyte required for operation of the cell substantially completely absorbed in the plates and separators, with the separators not being completely saturated.

12 Claims, 10 Drawing Figures

SEALED DEEP CYCLE LEAD ACID BATTERY

CROSS-REFERENCE TO RELATED APPLICATION

This application is a continuation-in-part of U.S. application Ser. No. 193,568, filed Oct. 3, 1980 now abandoned.

BACKGROUND OF THE INVENTION

This invention relates to lead-acid cells and, more particularly, to sealed, maintenance-free, lead-acid cells suitable for use in deep cycle applications in which the cells must be rapidly recharged.

The application of a cell or battery determines the way it is recharged. A stationary battery is charged very slowly at voltages a few millivolts above the open-circuit voltage of the battery. An automotive SLI battery likewise is on "float" charge most of its operating lifetime. Both the SLI battery and the stationary battery receive relatively shallow (less than 10% depth of discharge) discharges followed by relatively long charging periods between discharges. Hence, the total ampere-hours of charge to be returned to the battery during charge is small; and with a long charging period, a low charging rate is used.

Deep discharge batteries, such as lift-truck, golf-cart, electric vehicle, and remote photovoltaic system batteries, on the other hand are routinely, often daily, deeply discharged to greater than 50%, more typically, to a 70-80% depth of discharge, or more. Further, since these batteries are used typically on a daily basis, it is quite often necessary to completely recharge these batteries from a deeply discharged condition in less than 10–12 hours. These batteries therefore must be recharged with relatively high charging currents to fulfill both the time and complete recharge requirements of these battery systems.

When a lead-acid battery is recharged, virtually all of the charging current in the early portion of the charge is used to convert the discharged active material into charged active material. Depending on the charging rate, significant charging inefficiency generally appears when the battery is about 80 to 95% recharged. The higher the charging rate the sooner the charging inefficiency will begin. This charging inefficiency typically first appears at the positive electrode in the formation of oxygen gas. The negative electrode is much more efficient at accepting charge than the positive electrode and inefficiency at the negative in the form of evolution of hydrogen gas generally does not appear until the negative electrode is almost 95–100% recharged. These inefficiencies require that, in practice, the battery receive some overcharge, typically 5 to 15%.

In a conventional flooded electrolyte battery, the oxygen gas which is generated at the positive electrode escapes from the battery except for a very small amount which is dissolved in the electrolyte and eventually reacts at the negative electrode. The solubility of oxygen in sulfuric acid is extremely low and hence the faster the battery is being recharged, the greater the amount of oxygen gas which escapes into the atmosphere. For example, flooded electrolyte batteries used in telephone exchanges on a standby basis have an extremely low charging rate (typically lower than the C/120 rate) and oxygen generates so slowly that it can dissolve in the electrolyte and react at the negative electrode to yield a relatively high recombination rate.

This is not the case with flooded electrolyte batteries charged in 10–12 hours or less. In this case, the total gas flow out of the battery is equal to approximately 97% of all of the overcharge current, assuming that all overcharge current is used to generate oxygen and hydrogen gas. The remaining 3% represents that oxygen which is dissolved in the sulfuric acid electrolyte and reacts with the sponge lead negative active material. Thus, in a deep cycle, flooded electrolyte battery which is recharged in less than 10–12 hours, it is considered virtually impossible not to lose a measureable quantity of gas.

Most commercial chargers used to recharge batteries or cells employed in deep cycle applications are capable of delivering a certain maximum current on short circuit dependent on circuit design parameters. These chargers have a voltage limit and the current delivered into a battery is dependent on the difference ($\Delta E$) between the charger voltage and the battery voltage. The greater the difference in voltage between the charger and the battery, the higher is the current, up to the maximum output current of the charger. As the battery charges, the voltage difference between the battery and the charger decreases; and, hence, the current is reduced.

A lead-acid cell's voltage approaching the end of charge is determined principally by the negative electrode half-cell potential. The negative half-cell potential at which hydrogen begins to evolve, often referred to as the hydrogen overpotential, is significantly affected by the alloy composition of the negative grid. It is well known that calcium alloys have a higher overpotential for hydrogen than antimony alloys, and hence batteries having negative grids formed from calcium alloys can be charged to a higher voltage before hydrogen gas begins to evolve. Because typical commercial chargers, as well as the chargers in automobiles, charge all batteries to the same voltage, total gas evolved in a calcium battery is less than with an antimonial battery.

It is known that positive grids made using antimony-containing alloys may "poison" an antimony-free negative electrode and reduce the hydrogen overpotential of the negative electrode to that of an antimony negative, thereby causing a loss of the low gassing benefits of the system using antimony-free negative grids.

For many applications, the trend in lead-acid technology is to provide batteries which are maintenance-free, i.e.,—a type of battery which may be operated without adding water to the electrolyte during its recommended life. The life of such batteries is limited by the water loss due to gas evolution; and, therefore, excess electrolyte must be used to compensate for the water loss which occurs so as to provide a satisfactory life.

Typically, such cells or batteries have minimized the loss of water by using grid alloys having high hydrogen overpotential. Rigid, self-supporting, and sometimes structurally reinforced grids may be employed, using a variety of either antimony-free, or relatively low antimony, lead alloys. Examples of grid alloy systems used include calcium-lead, calcium-tin-lead, cadmium-antimony-lead, selenium-antimony-tin-lead with various optional alloying ingredients such as silver and arsenic as well as combinations of these alloys.

U.S. Pat. No. 4,166,155 discloses the use of a hybrid construction, utilizing a cadmium-antimony-lead alloy for the positive grids and a calcium-tin-lead alloy for the negative grids to provide a maintenance-free battery with improved water-loss characteristics. This patent likewise makes reference to such alloys as having deep cycle capabilities. The alloy system disclosed has also been used commercially in motive power type cells to reduce the frequency at which water additions are required from about once per week to about once every two months.

Further, lead-acid cells in which the electrolyte is immobilized in gel form are known. Such cells or batteries can provide not only maintenance-free but also spill-free characteristics, viz.—the batteries may be used in any attitude without electrolyte leakage. However, the cracks which develop in the gel during charge, while essential for oxygen transport, result in conditions which shorten cycle life in deep cycle applications.

To provide a sealed design yet avoid the potential problems with gelled electrolytes, sealed systems have been utilized in which electrolyte is immobilized and absorbed in special separators. The separators are not fully saturated, and the gases evolved during overcharge or at other times can diffuse rapidly from one electrode to the other. Thus, under the right conditions, the oxygen that is evolved at the positive electrode can diffuse to the negative electrode where it will rapidly react with active lead. Effectively, this reaction partially discharges the negative electrode, preventing the negative electrode from reaching its fully-charged state so as to minimize the evolution of hydrogen. This sequence results in what has been termed an "oxygen cycle". While the oxygen recombination rate is greater than the rate of oxygen being produced at the positive electrode, there should be minimal water loss and minimal pressure build-up. To allow for relatively rapid recharge following deep discharge, some commercial cells have been designed to operate at relatively high internal pressures (e.g., 25 to 50 psig) to insure an adequate rate of oxygen recombination. The design requirements for this type of cell are electrodes having large surface areas, highly porous, rapidly wetted separators and reduced electrolyte volume.

U.S. Pat. No. 3,862,861 to McClelland and Devitt is an example of a cell configuration recombining oxygen using relatively high internal pressures. The cell having a prismatic container described in *Progress in Batteries & Solar Cells*, Vol. 2, 1979, pp. 167–170, is an example of a cell operating at low pressures. The former cell utilizes grids that are essentially pure lead, and it can be used in float applications and in deep cycle applications in which limited life is acceptable. The latter cell has calcium-lead alloy grids, is used primarily for float applications, and is not considered suitable for long life, deep discharge applications.

At the present time, sealed lead-acid cells of these types have been available commonly in only small ampere-hour capacity sizes. Usage has thus been generally confined to standby applications such as emergency lighting, alarm systems and limited cycle life portable equipment such as television, lanterns and garden tools. While it has been suggested that a sealed, lead-acid system might be scaled up to larger sizes (*Engineering*, October 1978, *The Age of the Sealed Battery*, pp. 1020–22), this has not been successfully accomplished commercially.

In addition, sealed commercial designs typically use either essentially pure lead, as is suggested in U.S. Pat. No. 3,862,861, or lead-calcium grid alloys to take advantage of the high hydrogen overpotential characteristics of these alloy systems. U.S. Pat. No. 3,553,020 to Corbin et al. suggests that antimony be eliminated from the grid alloys used so that the battery evolves less gas during charge and has a lessened tendency for self-discharge. In addition, the use of relatively light weight, thin-wall, plastic battery containers employed in many battery applications has been restricted in sealed systems due to the belief that stronger, substantially more rigid containers are necessary to withstand the internal pressures that can develop. U.S. Pat. No. 3,862,861 thus suggests the use of a release valve such as a bunsen valve which is capable of retaining at least 10 to 15 pounds of internal pressure before venting occurs.

Because all of the commercially available sealed, lead-acid batteries use either a pure lead or a lead-calcium grid system, long life deep-discharge cyclic performance is typically poor. Thus, commercially available cells of the type generally shown in U.S. Pat. No. 3,862,861 are said by their manufacturer to provide a life of about 425 cycles to an 80% depth of discharge with a maximum charge voltage of about 2.43 volts. However, this requires 16 hours for recharge which is too long for practical use in most deep cycle applications requiring high ampere-hour capacities. If the charge voltage is increased to a level typically used for such applications, the life is reduced to about 60 cycles. For such cells, cycle life performance is highly sensitive to charge voltage in the 2.45 to 2.55 volt range that is typical of commercial chargers.

The sealed cell using a prismatic container which was previously described provides a life of about 300 cycles at a 100% depth of discharge. However, as was the case with the cell of the type shown in U.S. Pat. No. 3,862,861, this cycle life is predicted upon the use of a constant voltage recharge at 2.45 volts. Recharging at constant current reduces the life to about 150 cycles or so. These cycle lives are based upon a discharge rate of C/5.

It is well known that the presence of antimony in the positive grid alloy is essential to insure good deep cycle performance. However, antimony-containing positive grid alloys have not been previously used in sealed systems for the reasons set forth in U.S. Pat. No. 3,553,020 to Corbin et al., as previously discussed herein.

SUMMARY OF THE INVENTION

A principal object of the present invention is to provide a maintenance-free, lead-acid cell that is capable of achieving long cycle life in deep-cycle applications that require rapid recharging.

A related object is to provide a sealed, absorbed electrolyte, lead-acid cell that is capable of being recharged at a high charge rate from a state of deep discharge to a full state of charge while operating at a low internal pressure, and that has long cycle life in deep discharge applications.

A further object is to provide a sealed, lead-acid cell in which the cycle life for deep-cycle applications is not significantly adversely affected by high end-of-charge voltages.

A still further object provides a sealed, lead-acid cell characterized by relatively slight capacity loss over its useful life in deep discharge applications.

Another object of the present invention is to provide a sealed, lead-acid cell which can be designed in sizes ranging from small to extremely high capacities.

Yet another object of this invention lies in the provision of a sealed, lead-acid cell characterized by improved volumetric and gravimetric energy density.

Another object is to provide a sealed, lead-acid cell which substantially eliminates the electrolyte stratification which occurs in cells subjected to deep discharges. This provides a cell having high energy efficiency, longer life, eliminates or substantially reduces the necessity for equalization charging and increases the volumetric and gravimetric energy density.

Other objects and advantages will be seen from the following description and drawings.

DESCRIPTION OF THE PREFERRED EMBODIMENT

While the present invention is susceptible to various modifications and alternative forms, there is shown in the drawings and will herein be described in detail, the preferred embodiments. It is to be understood, however, that it is not intended to limit the invention to the specific forms disclosed. On the contrary, it is intended to cover all modifications and alternative forms falling within the spirit and scope of the invention as expressed in the appended claims. As an example, prismatic containers will be described, but cylindrical containers certainly could be employed, if desired. Further, the invention is, of course, equally applicable to either a single cell or a plurality of cells connected together to form a battery. It should be understood that a deep discharge cell in accordance with the invention can also be used in float applications. Still further, while the invention will be described in connection with cells of larger capacity sizes, it should be appreciated that it is likewise useful in providing small capacity sizes as well.

In general, the present invention is predicated on the discovery that a sealed, maintenance-free, absorbed electrolyte, lead-acid cell that is capable of long cycle life in deep discharge applications requiring rapid recharging can be provided by utilizing a hybrid grid alloy system having a low antimony, lead alloy for the positive grids and an antimony-free lead alloy for the negative grids. Sealed, absorbed electrolyte systems have not utilized antimony-containing grid alloys due to the generally accepted view that the presence of antimony would be expected to result in the generation of sufficient hydrogen to prevent an efficient oxygen recombination cycle, essential for maintenance-free use, from being established. Surprisingly, however, the sealed, lead-acid cell of this invention provides a long life without maintenance for deep cycle applications at extremely low internal pressures.

Indeed, for high rate discharge (C/2 or higher), short cycle life applications such as, for example, golf-carts, the cells of the present invention should provide maintenance-free operation at an 80% depth of discharge for about 400-500 cycles, twice that of commercially available golf-cart cells which at the present time are lead-acid cells vented to the atmosphere. For low rate discharge (C/5 or lower), high cycle life applications, such as, for example, fork-lift trucks, maintenance-free operation is expected to provide up to 2,000 or so cycles, some 33⅓% more than the cycle life of commercially available systems which are also lead-acid cells vented to the atmosphere.

The sealed, maintenance-free, absorbed electrolyte, lead-acid cells of the present invention are further characterized by highly predictable behavior. Assuming freedom from any mechanical defects such as might occur, for example, in assembly, the primary mode of failure occurs through positive grid corrosion. This results in a cell which experiences only relatively moderate capacity decline until failure occurs. Further, this type of behavior allows the various materials used to be optimized for the requirements of a particular end use application. Another aspect of the behavior of the cell of the present invention is that loss in capacity is directly related to the water loss experienced. This allows the life of the cell, from this standpoint, to be quite accurately determined.

Still further, the sealed, maintenance-free, absorbed electrolyte, lead-acid cells of this invention are capable of being recharged at a sufficiently rapid rate to allow utilization in deep cycle applications requiring recharge in 10 to 12 hours or less without adversely affecting the useful service or cycle life of the cell. Stated another way, even with such rapid recharging, the service life of cells according to the present invention should be dictated by limitations due to positive grid corrosion, not by water loss or loss of capacity.

Figures 1, 2:
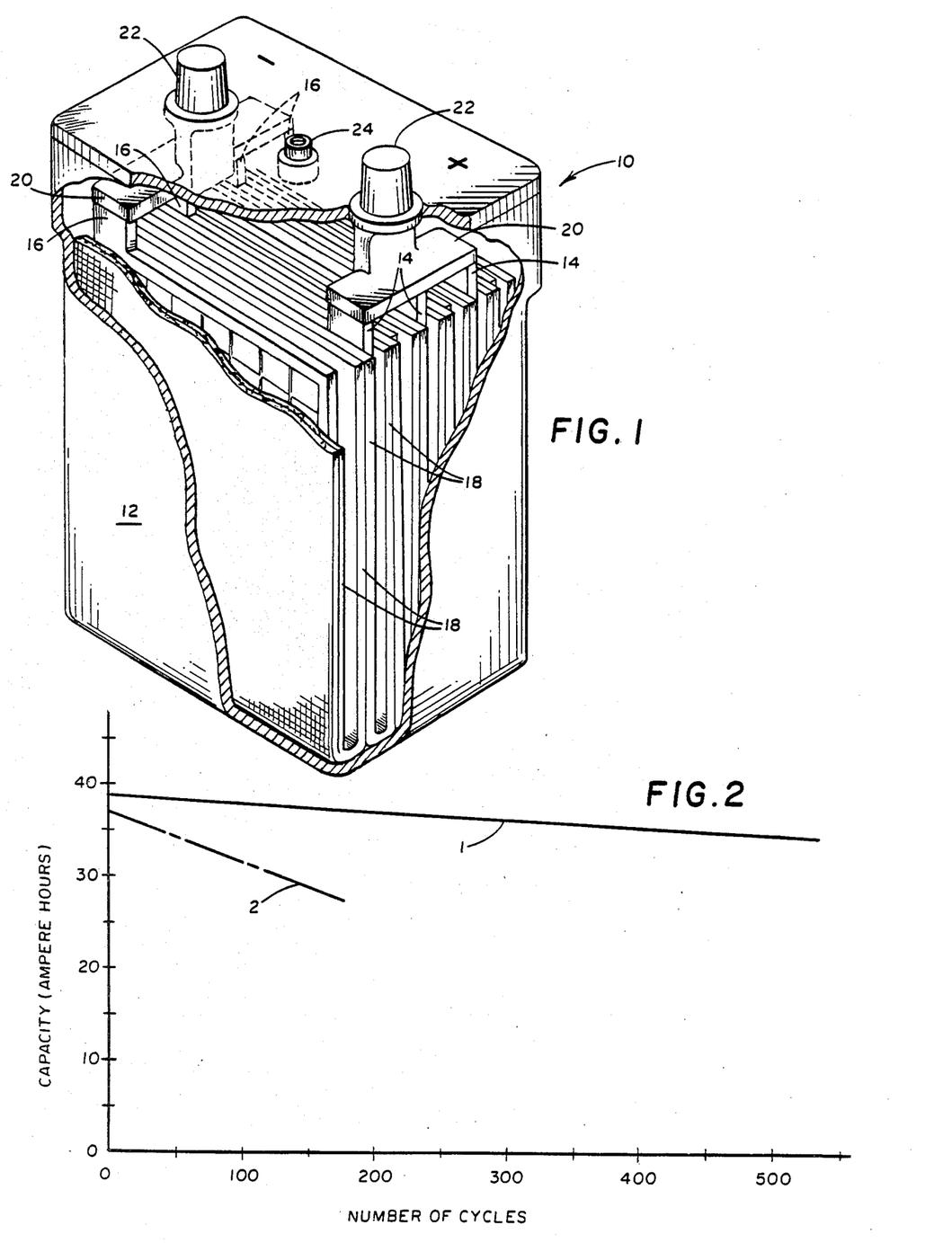
FIG. 1 is a perspective view of a cell made in accordance with the present invention, partially cutaway to show the internal configuration.
FIG. 2 is a graph of capacity versus number of cycles and illustrates the improved performance obtained by utilization of the cell of the present invention.

Turning now to the drawings, FIG. 1 shows a cell 10 in accordance with the present invention. The cell 10 has a container 12 containing a plurality of positive and negative electrodes, 14 and 16 respectively, separated by absorbent separators 18.

The electrical connections necessary can be made by any of the several techniques which are known in the art. The particular technique employed does not form a part of the present invention. As shown, conductive straps 20 join the electrodes together, and the straps 20 are connected to external terminals 22 by conventional means. Release venting is provided by a low pressure, self-resealing relief valve, such as, for example, a bunsen valve 24. Preferably, the relief valve used is the vent valve disclosed in Szymborski et al. U.S. application Ser. No. 221,158, filed Dec. 29, 1980, which is incorporated by reference herein.

The electrodes, 14 and 16, and separators 18 should be snugly fit within the cell container 12, i.e., the electrodes and separators should stay in the assembled condition when the container is inverted. The electrodes can be sized to almost the interior dimensions of the container. However, to eliminate the possibility of internal shorts, it is desirable to size the separators used such that the edges extend slightly past all of the edges of the electrodes, as is shown in FIG. 1. One means of achieving this at the bottom of the electrodes is to fold the separator around the electrode with a U-fold as depicted in FIG. 1.

Highly efficient use of the internal container is obviously thus provided. However, if desired, spacing means, such as shims, could be employed if an oversized cell container is used for any reason.

Considering the present invention in greater detail, the positive electrodes 16 utilize a grid formed from a self-supporting, low-antimony, lead alloy. The antimony content should be, as a minimum, sufficient to provide the necessary deep cycling capability. To this end, the antimony content should generally be at least about 0.5 wt.% or so, based upon the total weight of the alloy. On the other hand, the antimony level should not be so high as to unduly impair the electrochemical characteristics of the cells of the present invention, e.g.—the ability to rapidly recharge without excessive water and capacity loss for maintenance-free performance. With this in mind, the antimony content, based upon the total weight of the alloy, can range up to 1.6 or 1.8 wt.%, perhaps up to about 2.0 wt.%. As used hereinafter, the term low-antimony lead alloy means a lead alloy having an antimony content with the characteristics described in this paragraph.

While many such low-antimony lead alloys are known and may be employed, it is preferred to use for the positive grids a cadmium-antimony-lead alloy in which the antimony is present in an amount of about 0.5 up to about 2.0%, more preferably 1.2 to 1.6 or 1.8%, and the cadmium is present in an amount of about 0.5 to 2.0% or so, both being based upon the total weight of the alloy. The amount of cadmium should be generally the same as that of the antimony, typically being no more than about 10-20% less than, or greater than, the antimony content.

The positive grids can be pasted and cured by known techniques. Positive paste density of about 4.2 to 4.3 gms.cm.$^3$ have been found suitable. It is believed that the paste density can be lower, if desired; and, indeed, such lower paste density should increase active material utilization. Leady litharge and red lead oxide are equally suitable for use in making the paste. Also, other than adjustments to provide the desired density, conventional paste formulations may be employed.

Any antimony-free lead alloy capable of providing a self-supporting grid may be used for the negative grid alloy. Various alloy systems are known. It is thus suitable to utilize a calcium-tin-alloy in which the calcium content is from about 0.06 to 0.2% and the tin is in the range of 0.1–0.5% (preferably 0.2–0.3), both percentages being based upon the total weight of the alloy.

The negative active material may be formed, as is known, from a leady litharge. The density should be sufficiently low so as to increase the apparent surface area of the electrodes to provide the desired oxygen recombination reaction rate. To this end, the density is suitably in the range of about 3.6-to-4.1 grams/cm$^3$. Mossing of the negative active material and shedding of the positive active material are prevented by the snug fit of the electrodes within the absorbent separators utilized. Furthermore, in the illustrative embodiment, the propagation of negative active material around the edges of the plates (which in a flooded cell can give rise to internal shorts) is obviated because of the absence of an electrolyte path at the edges.

In some cases it has been found that cells in which the active materials were formed from pastes substantially free of tetrabasic lead sulfate are less susceptible to degradation in cyclic performance in comparison to active materials formed from pastes having significant levels of tetrabasic lead sulfate. Providing a paste substantially free of tetrabasic lead sulfate can be achieved by known techniques such as curing the unformed paste at temperatures less than about 65° C. or so.

As is well known, the thickness of the grids used will depend, in general, upon the performance characteristics required for the particular application involved. Typical design procedure for positive grids in conventional flooded electrolyte lead-acid cells, dictates that a thickness be employed such that failure of the cell should be due to positive grid corrosion. In actual practice, the failure mode is typically other than positive grid corrosion. However, in contrast to such conventional cells, as has been previously noted, the performance of the cells of this invention is such that service life should be dictated by positive grid corrosion rather than water or capacity loss or other modes of failure. In other words, in designing a cell in accordance with the present invention, the service life for the particular application should be capable of being predicated upon the known and predictable effects of positive grid corrosion without any substantial concern regarding other possible failure modes.

As may be appreciated, known low-antimony lead alloys can contain a variety of other alloying ingredients. Any such alloying ingredients may likewise be utilized here, so long as the amount utilized does not significantly and adversely affect the performance of the resulting cell.

The material used for the separators 18 should be stable in the sulfuric acid electrolyte used, resistant to oxidation by $PbO_2$ and not release materials into the electrolyte which would deleteriously affect cell performance. In addition, the material should be highly porous, e.g.—at least 70 to 75%, desirably up to about 90 to 95% or so, and should be sufficiently compressible to at least substantially conform to the changing shapes of the electrodes during assembly and service. Further, average pore diameter should be sufficiently small to prevent propagation of dendrites from the negative plate and shedding of the active material from the positive plate. The average pore diameter should, however, be sufficiently large to be easily wetted by the electrolyte and not so small as to result in an unduly high internal impedance. The separator material must also be capable of wicking the electrolyte through the desired height of the separator.

Lastly, and importantly, the separator material must preferably provide, in service, a substantially uniform void volume throughout the separator. The separator thus provides sufficient void volume during normal operation to support the rate of oxygen transport necessary for the internal pressure desired for the cell. In other words, when the cell is filled with the amount of electrolyte required for normal operation, sufficient void space remains in the separator to permit the oxygen generated at the positive during the latter stages of charge to diffuse in the gaseous state to the negative and be reduced (recombined). The cell has sufficient void space in the electrolyte absorbing separator so that the oxygen diffusion rate approximately equals the rate at which the oxygen is evolved.

It is believed that the void volume of the separator material is achieved through some of the pores having their walls covered with a film of electrolyte while the central portion of the pore is free from electrolyte. Adequacy of the void volume can be determined by weight loss (water) determinations made during cycling. Unduly high water loss should not result if the material is suitable.

The thickness of the separator will, in general, be determined by the cell capacity and the expected operating rate for the particular application. In this respect, the separator thickness used does not materially differ from those found suitable for other types of lead-acid cells used for the particular end use application. As examples, a separator thickness of 80 mils for a golf-cart cell and a thickness of about 160 mils for a forklift truck application are suitable. If desired, a reinforcing member such as a scrim may be employed to reduce handling problems during assembly.

It has been found suitable to use a borosilicate glass material formed from glass microfibers and chopped strands for the separator material. Materials of this type are commercially available and have been previously utilized for sealed, lead-acid cells. One such material (C. H. Dexter Division, The Dexter Corporation, Windsor Locks, Connecticut, "Grade X4225") that has been found satisfactory has the following typical properties: nominal thickness of 40 mils, air permeability (ASTMD737-75) of 8.5 l/min/100 cm.$^2$ at 12.7 mm. water P (Gurley Permeometer Model 4301), an average pore size of 12.6 microns and a porosity (by mercury intrusion) of 1.2 meters$^2$/gram.

For a given cell for a particular application, the full charge specific gravity for the electrolyte needed can be readily computed. Typically, full charge specific gravities in the range of 1.285 to 1.320 or 1.350 will be satisfactory. Particular applications may make it desirable to use somewhat higher or lower acid gravities.

The formation of the pasted electrodes can be carried out by known techniques. Thus, prior to assembly in the cell container, the electrodes can be formed by conventional tank formation. When this technique is employed, the formed electrodes should be dried to remove the residual electrolyte.

Desirably, however, the unformed electrodes and separators are placed in the cell container, the necessary electrical connections made, the cell cover sealed to the container, the necessary electrolyte added through the aperture in the cover for the relief valve, and the valve then put in service position. Formation is then carried out using conditions suitable for conventional one-shot, lead-acid formation. It may be useful, however, to employ somewhat less severe formation finishing conditions than those conventionally used. If the pastes contain significant amounts of tetrabasic lead sulfate, excessive gassing, and thus water loss, will occur so that water addition after formation will be necessary. Pastes substantially free from tetrabasic lead sulfate should not experience sufficient water loss in formation to require any water addition.

It should be noted that, when in situ formation is employed, initiation of formation should take place within about $\frac{1}{2}$ to 1 hour or so after the electrolyte is added. Longer delays can result in conditions which may ultimately create internal shorts.

The amount of electrolyte employed should preferably not result in the absorbent materials of the cell being fully saturated, i.e.—the cell should be in an electrolyte-starved condition. While the cell in service is self-regulating, a fully saturated condition will result in undue gassing during the initial strages of charging during cyclic operation. Further operation will reach an equilibrium state where an efficient oxygen recombination cycle is achieved. The somewhat higher gassing which occurs during the initial stages can be substantially eliminated by determining the particular void volume required for efficient oxygen recombination. However, it has been found suitable to add electrolyte sufficient to saturate the absorbent capacity of the cell system to a level of about 90%.

The particular ratio of negative active material to positive active material is not particularly critical insofar as efficient oxygen recombination is concerned. It will, however, be generally desirable to keep the relative amounts in balance so as to optimize active material utilization.

The cell of the present invention immobilizes the electrolyte so that the substantial stratification exhibited by conventional, flooded or free-electrolyte systems is significantly reduced. This provides a cell characterized by more uniform utilization of the active material and, therefore, a longer life.

It has been found that efficient oxygen recombination cycles can be achieved at internal cell pressures of less than 10 psig. Pressures of 4.5 to 7 psig, or even less, are suitable.

The type of cell container used will depend upon the application and the internal pressures desired. Industrial applications such as, for example, a forklift truck can employ cell container configurations used for conventional cells. For an application such as a golf-cart, the container strength will be dependent upon the relief venting pressure employed.

The following Examples further illustrate, but are not in limitation of, the present invention. Unless otherwise set forth, all percentages are by weight.

EXAMPLE 1

This Example shows the improved deep-discharge cyclic performance capable of being achieved by the present invention in comparison with cells containing conventional calcium-tin-lead grids used for maintenance-free applications.

Cells of nominal 37.5 ampere-hour capacity were assembled. Five electrodes (2 positive, 3 negative) were used, the electrode dimensions being about 1 15/16 inch $\times$ 15 $\frac{1}{4}$ inch with a thickness of about 0.165 inch. The positive active material paste of an unformed density of 4.3 grams/cm.$^3$ was made from a red lead oxide (25% $Pb_3O_4$, 75% PbO). The negative active material of an unformed density of 3.8 grams/cm.$^3$ was made from a leady litharge, using 2% of a conventional expander.

The grids for the control cells were cast from a calcium-tin-lead alloy having a nominal composition of 0.09% calcium and 0.3% tin, as were the negative grids of the cells according to the present invention. The positive grids for the cells of this invention were made from a cadmium-antimony-lead alloy having 1.24% cadmium and 1.4% antimony present.

The grids were hand-pasted and then cured. The curing conditions involved exposure to a 100% relative humidity atmosphere at about 60° C. for about 16 hours, followed by exposure to a zero percent relative humidity atmosphere for about 24 hours, also at 60° C.

Two layers of the borosilicate glass material previously described herein were used as the separator. The layers were U-folded around the electrodes as shown in FIG. 1.

A makeshift prismatic container was made using a large plastic cylinder, epoxied to provide a cavity into which the electrodes and separators, having the necessary electrical connections, were fitted. The cover was sealed onto the cylinder, sulfuric acid electrolyte of 1.245 specific gravity added through a relief valve aperture in the cover, and the relief valve was fitted into position. The relief valve was designed to unseal at an internal pressure of 7.5 psig.

Formation was carried out using a total regime of 120 hours, inputting 250% of the nominal cell capacity. The specific gravity after completion of formation was computed to be about 1.290–1.300.

A total of 7 cells were constructed, 3 control cells and 4 cells according to the present invention. All cells were subjected to a cycling regime involving discharging at 8.5 amps for 3.5 hours, followed by a 30% overcharge, based upon the capacity taken out during discharge. A three-step charging sequence was used, involving 10 amps for 2.5 hrs., followed by 5 amps for 1 hr., and finally 2 amps for 4.5 hrs.

The results are illustrated in FIG. 2, based upon the average values for the cells. As shown in FIG. 2, the cells of the present invention, line 1, had lost only moderate capacity after 600 to 700 cycles whereas the capacity of the control cells, having a lead-calcium grid alloy, line 2, had fallen below 80% of the nominal capacity before 200 cycles had been reached. The failure mechanism for these control cells was identified as a high resistance interface film formed between the positive grids and positive active material. This failure mechanism is a common mode of failure in calcium alloy batteries subjected to deep cycle usage. The failure mechanism for the cells in accordance with the invention was positive grid corrosion. It should be noted that the severe 30% overcharge (in comparison to typical applications where 5 to 10% overcharge would be employed) was used to accelerate water loss.

EXAMPLE 2

This Example shows the superiority of cells made with positive grids of the preferred cadmium-antimony-lead alloy in comparison to cells made with a commercially available antimony-lead alloy containing more than 2 wt.% of antimony.

Five cells using cadmium-antimony-lead alloy (cadmium-1.3%; antimony-1.5%) for the positive grids and six cells using the commercially available antimony-lead alloy for the positive grids were made. The composition of the latter alloy was 2.1% antimony, 0.002% cadmium, 0.36% arsenic, 0.22% tin, 0.053% copper, 0.0044% sulfur and the remainder lead. (A prior analysis indicated an antimony content of 1.92 wt.%, but the 2.1 wt.% set forth herein is considered more representative in view of the nominal 2.2 wt.% indicated for the commercial alloy.)

Figure 3:
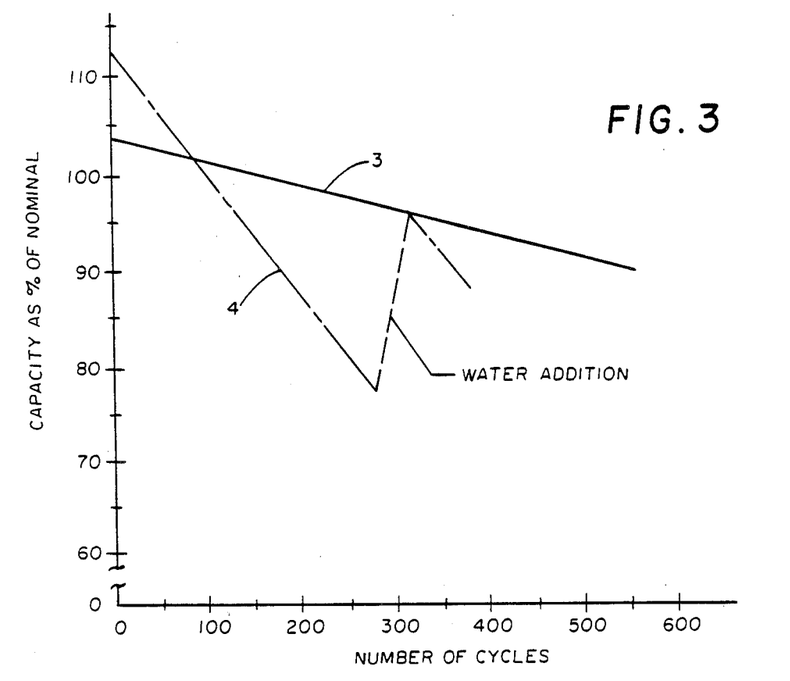
FIG. 3 is a graph of capacity as a percent of nominal capacity versus number of cycles and illustrating the improved performance obtained by utilization of the preferred grid alloy system of the present invention.

The cells were made, assembled and tested as set forth in EXAMPLE 1. FIG. 3 illustrates the superiority of the cells using the preferred positive grid alloys (line 3—average values for the 5 cells) in relation to the cells using a commercially available antimony-lead alloy (line 4—average values for the 6 cells).

When the capacity of the cells using the commercial antimony-lead alloy had fallen below 80% of the nominal capacity, a significant weight loss was observed, and water was added to restore the cells to their original weights. The cells were then placed back on the cycling regime. The increase in capacity after water addition shows that capacity degradation was attributable to water loss.

Figure 4:
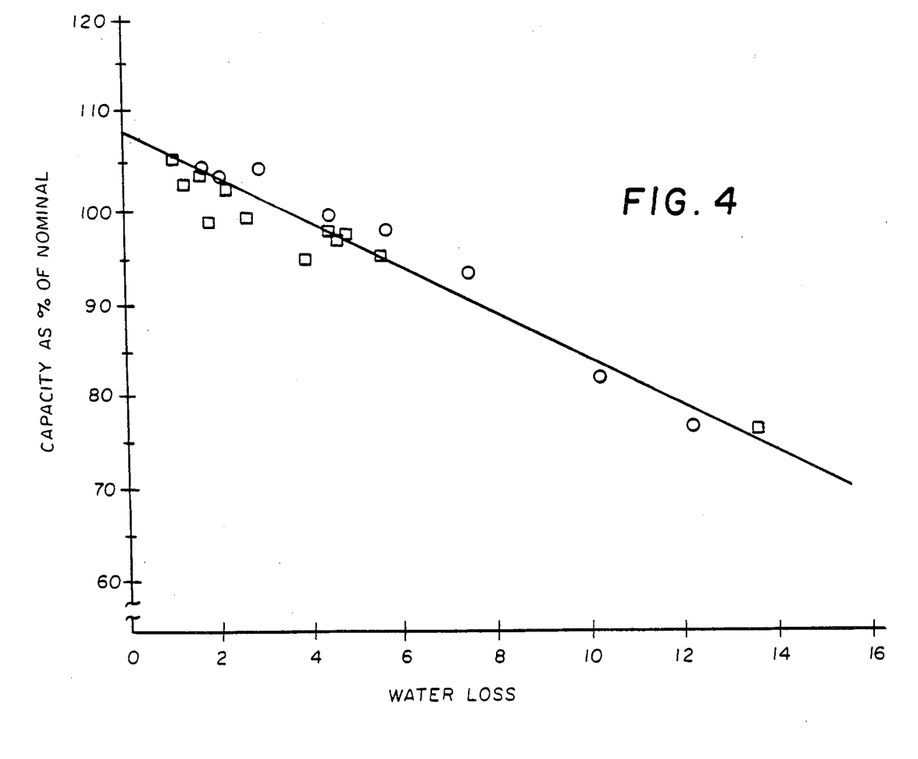
FIG. 4 is a graph of capacity as a percent of nominal capacity versus water loss as a percentage of the total water in the cell.

The capacity data shown in FIG. 3 was plotted in FIG. 4 versus water loss as a percentage of the total water available in the cell. The average values are set forth, the squares representing values from the cells using positive grids made from the cadmium-antimony-lead alloys and the circles representing values from the cells where the commercially available, antimony-lead alloy was used. As seen, capacity degradation is directly related to water loss and is independent of the alloy composition.

Figure 5:
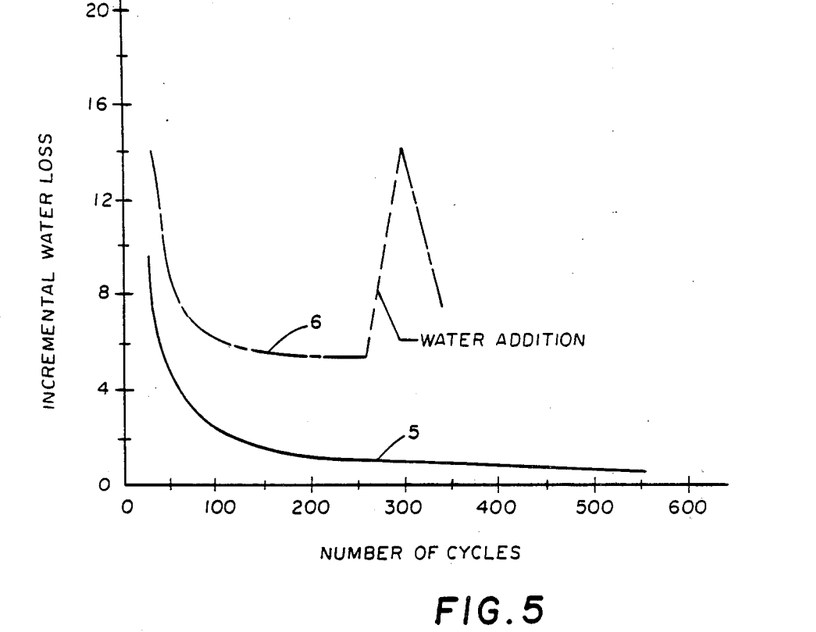
FIG. 5 is a graph of the incremental water loss versus number of cycles and further illustrates the improved performance obtained by employing the preferred grid alloy system.

FIG. 5 shows the incremental water loss throughout the cycling. The incremental water loss was determined by periodically measuring the weight loss of the cells and comparing this to the theoretical water loss that would be experienced if all the overcharge the cells received during the cycling resulted in gassing, and, therefore water loss. The water loss set forth is the ratio of the actual weight loss to the theoretical water loss expressed on a percentage basis. After the initial cycling, the cells using the preferred alloys (line 5) reached an equilibrium condition at which the efficiency of the oxygen recombination reaction was about 98%. The cells using the other alloy (line 6) reached an equilibrium at which the efficiency was about 94%.

EXAMPLE 3

This Example illustrates the effect of utilizing active material pastes treated to insure the absence of tetrabasic lead sulfate.

The four cells according to the present invention which were made in EXAMPLE 1, and cured by the preferred technique, were compared to identical cells, save for the curing technique used for the paste. The cured paste used in the cells from EXAMPLE 1 were examined by x-ray diffraction to confirm the absence of tetrabasic lead sulfate.

New cells were made in which the pastes were cured at 80° C., involving exposure to a 100% relative humidity atmosphere for 16 hrs., followed by exposure to a zero percent relative humidity atmosphere for 24 hours. After formation, water addition was made to compensate for the weight loss incurred during formation. The presence in the cured active material pastes of tetrabasic lead sulfate was confirmed by X-ray diffraction. The cycling regime for these new cells involved the same discharge cycle as described in Example 1, followed by a charging sequence of 10 amps for 2.8 hrs. and then 2 amps for 5.35 hrs.

Figure 6:
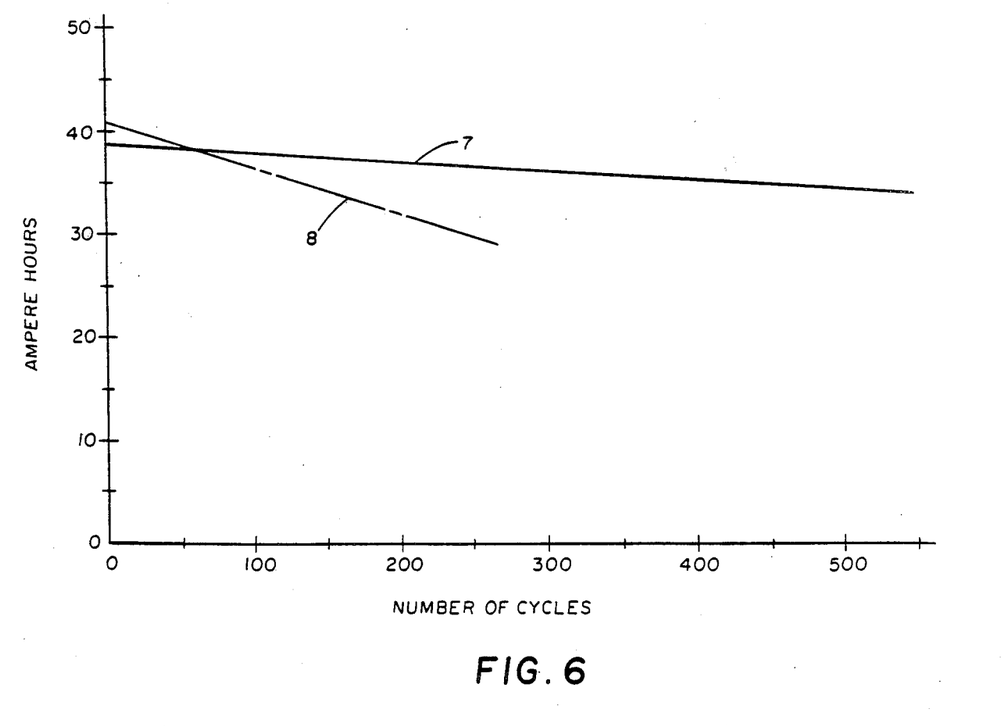
FIG. 6 is a graph of capacity versus number of cycles and illustrating the improved performance obtained through use of pre-formation treatment in accordance with one aspect of the present invention.

FIG. 6 shows the improved performance obtained when pastes free from tetrabasic lead sulfate were used (line 7; line 1 from FIG. 2). The cells using pastes having some tetrabasic lead sulfate present (line 8) failed (viz.—capacity fell below 80% of nominal capacity) before 300 cycles were reached in comparison to the over 600 cycles reached by the other cells.

Figure 7:
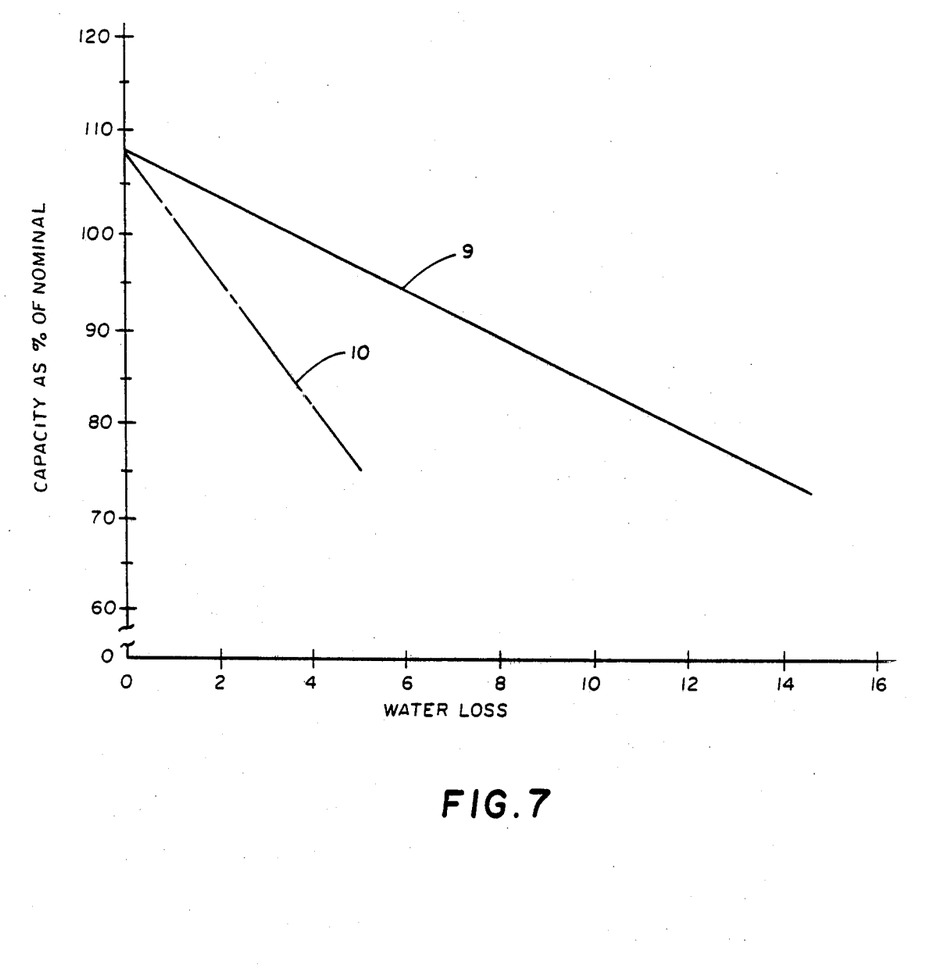
FIG. 7 is a graph of capacity as a percent of nominal capacity versus water loss as a percentage of the total water in the cell and further showing the effect of pre-formation treatment on gas recombination efficiency.

FIG. 7 illustrates that capacity degradation can depend upon the presence or absence of tetrabasic lead sulfate in the active material pastes. Line 9 represents the cells made from tetrabasic lead sulfate-free pastes while line 10 sets forth the water loss for the cells using active material pastes having tetrabasic lead sulfate present.

EXAMPLE 4

This Example illustrates the charge characteristics of cells made in accordance with the present invention.

Two cells of nominal 75 ampere-hour capacity were assembled using cadmium-antimony-lead alloy (cadmium-1.38%; antimony-1.5%) for the positive grids and calcium-tin-lead alloy (calcium-0.09; tin-0.3%) for the negative grids. Seven electrodes (3 positive, 4 negative) were used, the electrode dimensions being about 5.65 inches×7.65 inches with a thickness of about 0.165 inch. The positive active material had an unformed density of 4.3 g/cm.$^3$ and was made from a red lead oxide. The negative active material had an unformed density of 4.27 g/cm.$^3$ and was made from a leady litharge, using 2% of a conventional expander.

The plate separation was about 0.160 inch. The borosilicate glass material previously described was used for the separators.

The containers used were standard industrial battery containers fabricated from clear polystyrene material. Mating covers were sealed onto the containers after the assembled electrodes and separators were fitted in the containers. 1.25 liters of sulfuric acid electrolyte of 1.245 specific gravity was added through a relief valve aperture in the cover, and the relief valve was fitted into position. The relief valves used were in accordance with the disclosure in U.S. application Ser. No. 221,158. The relief valve was designed to unseal at an internal pressure of about 5 to 6 psig.

Formation was carried out using a total regime of 120 hours, inputting 250% of the nominal cell capacity. The specific gravity of the electrolyte after completion of formation was about 1.300.

After approximately 25 deep discharge-rapid recharge cycles, the two cells were discharged to a 100% depth (to 1.7 volts/cell) at C/5, and then each cell was recharged to a 110% return of charge at a maximum current of C/3 (25A) and a maximum voltage of 2.46 v/cell. The charging current, cell voltage, and negative electrode potential versus a PbO$_2$ reference electrode were measured for each cell as the charging continued, and the average values observed for the two cells are plotted as a function of charging time of FIG. 8. Line 25 is the plot of charging current as a function of charging time; line 27 is the plot of cell voltage as a function of charging time; and line 28 is a plot of negative potential as a function of charging time. Percent return of charge as a function of charging time (line 26) is also plotted in FIG. 8.

Figure 8:
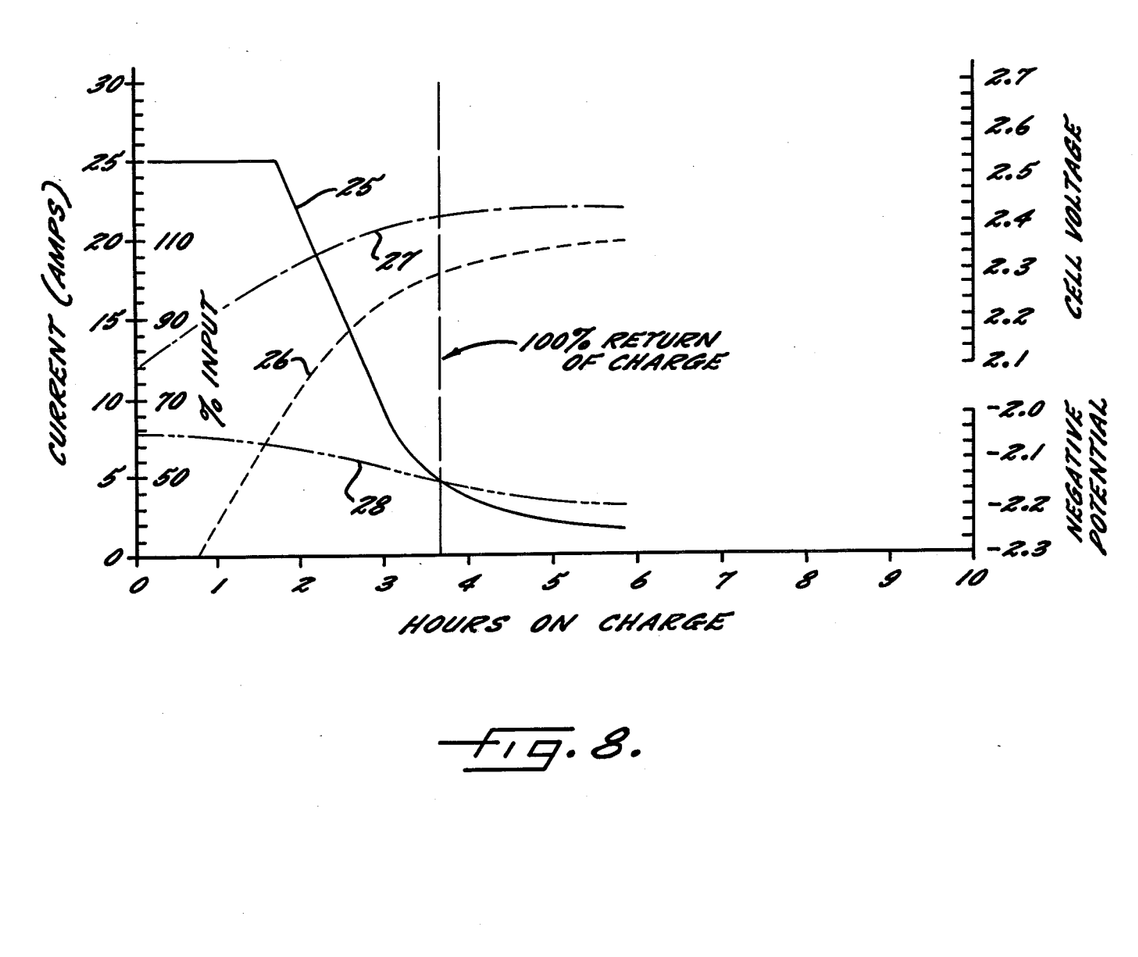
FIG. 8 is a graph illustrating the charge characteristics of the cell for a charge from 100% depth of discharge to a 110% return of charge at C/3 maximum current and 2.46 v/cell maximum voltage; charge current, percent return of charge, cell voltage, and negative potential are plotted against hours on charge.

FIG. 8 shows that the negative electrode potential never declined below about −2.2 v. It has been found that hydrogen gas is not generated at the negative electrodes until the negative potential declines to about −2.35 to −2.40 volts versus a PbO$_2$ reference electrode. Accordingly, FIG. 8 demonstrates that no hydrogen gas was generated during the charging.

The plots of cell voltage versus charging time (line 27) and charging current versus charging time (line 25) in FIG. 8 illustrate that the charging current decreases as the cell voltage increases. As previously discussed, this occurs because charging current is directly proportional to the difference between the cell voltage and the voltage of the charging mechanism, and this difference diminishes as the cell is charged.

EXAMPLE 5

Figure 9:
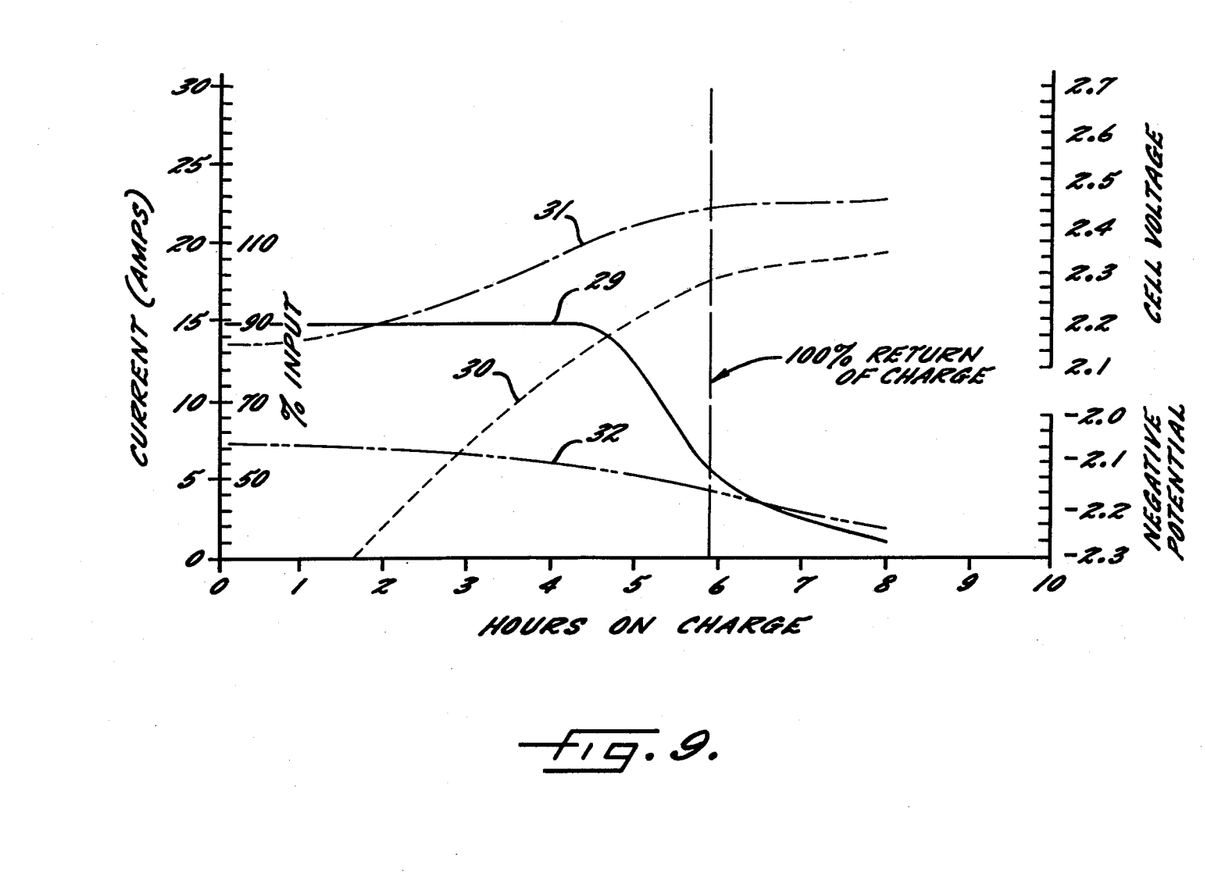
FIG. 9 is a graph illustrating the charge characteristics of the cell for a charge from 100% depth of discharge to a 110% return of charge at C/5 maximum current and 2.45 V/cell maximum voltage; charge current, percent return of charge, cell voltage, and negative potential are plotted against time on charge.

The two cells discussed in EXAMPLE 4 were discharged to a depth of 100% (1.7 volts) at C/5, and each cell was then recharged to a 110% return of charge at a maximum current of C/5 (15A) and a maximum voltage of 2.45 v/cell. As in the case of the discharge at C/3, the charging current, cell voltage, and negative electrode potential versus a reference electrode were measured for each cell as the charging progressed. The average values observed for the two cells are plotted as a function of charging time in FIG. 9, together with a plot of percent return of charge versus charging time (line 30). Line 29 is charging current plotted as a function of charging time; line 31 is a plot of cell voltage as a function of charging time; and line 32 is a plot of negative potential as a function of charging time. In addition, the gas within each cell container was periodically analyzed for the concentration of oxygen and hydrogen, and based upon the known volume within the cells, the total number of moles of each gas present in the cells was calculated. The average number of moles of oxygen and hydrogen respectively within the cells is plotted as a function of charging time in FIG. 10. Line 33 is a plot of millimoles of hydrogen in the cell as a function of charging time; and line 34 is a plot of millimoles of oxygen in the cell as a function of charging time. The plots of percent return of charge (line 30) and charging current versus charging time (line 29) given in FIG. 9 are repeated in FIG. 10 to provide correlation between the two figures. FIG. 9 indicates that the potential of the negative plates never declined below about −2.25 v, so that hydrogen gas should not have evolved. The plot of the hydrogen gas content in the cell versus charging time (line 33) in FIG. 10 shows that there was no significant change in hydrogen concentration during the charging, confirming that hydrogen was not generated.

Figure 10:
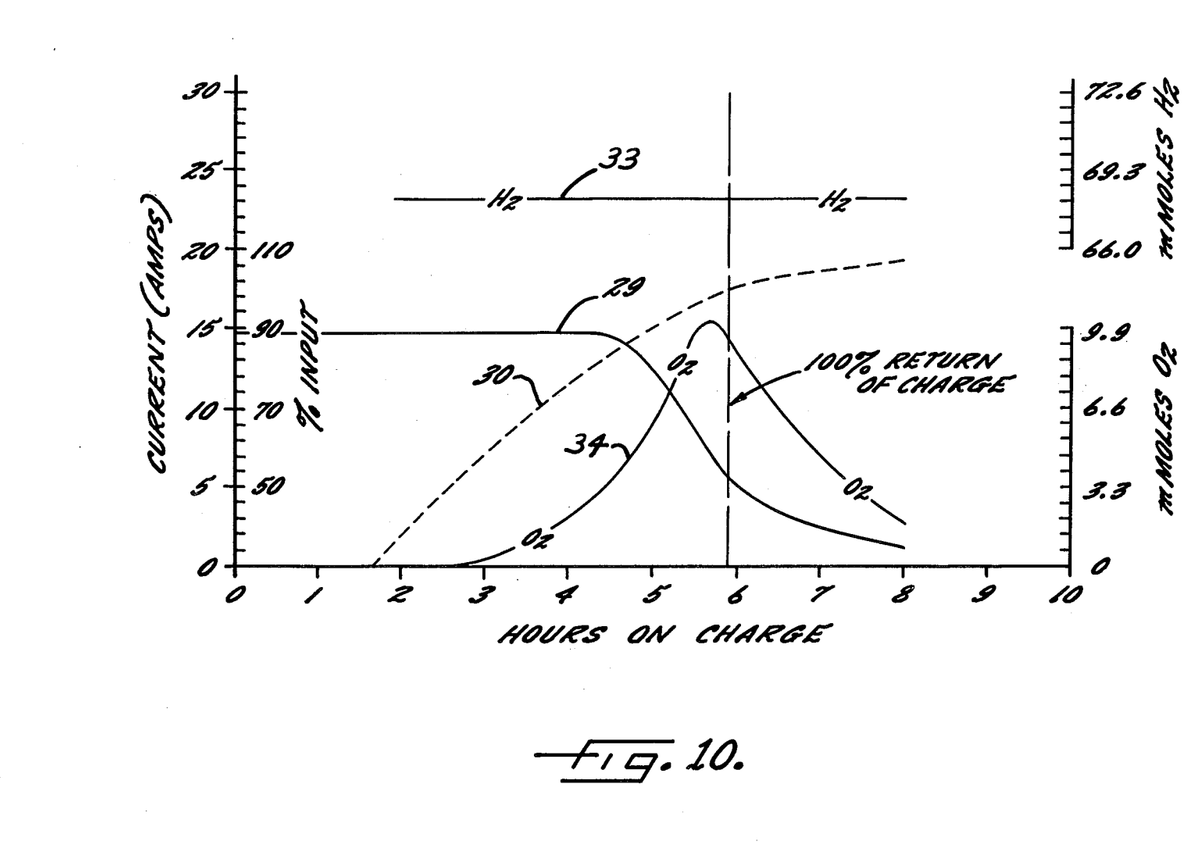
FIG. 10 is a graph further illustrating the charge characteristics of the cell for the charge represented in FIG. 9; charge current, percent return of charge, moles of hydrogen gas in the cell, and moles of oxygen gas in the cell are plotted against time on charge.

The plot of the oxygen gas content in the cell versus charging time (line 34) given in FIG. 10 shows that oxygen was being generated and had begun to accumulate after approximately 2.5 hours of charging. Each 3.5 millimole increase in oxygen gas corresponds to a 1.0 psig increase in internal pressure. As can be seen from FIG. 10, 2.5 hours into the charging period corresponded to approximately a 50% return of charge. Oxygen continued to accumulate until approximately 5.5 hours into the charge period, a time corresponding to a return of charge of slightly less than 100%. After this point, the amount of oxygen present decreased. This is interpreted as showing a decrease in the rate at which oxygen was generated resulting from the decreased charging current. The oxygen continued to react at the negative electrodes causing the amount of oxygen in the cell to decrease. The maximum amount of oxygen that accumulated in the cells, on the average, during the charging was approximately 10 millimoles, corresponding to about a 2.85 psig increase to internal pressure.

Thus, as has been shown, the present invention provides a sealed, absorbed electrolyte, maintenance-free lead-acid cell that is capable of achieving long cycle life in deep-cycle applications that require rapid recharging. Despite the presence of antimony in the positive grids, an extremely efficient oxygen recombination cycle is achieved at low-pressures. This allows the cells of this invention to be used in deep cycling applications (e.g.—50% depth of discharge or greater) in which designs requiring high internal pressures could not practically be utilized. The cells can thus be used in applications requiring ampere-hour capacities substantially greater than 25. Indeed, batteries of up to 450 AH have been demonstrated, and there is no known reason that even higher-capacity sizes could not be made.

The cell of this invention is a well-behaved system, allowing predictable determination of performance characteristics and optimization of the materials utilized. More specifically, there is a good correlation between capacity degradation and water loss, and failure is typically limited to positive grid corrosion.

Hydrogen is not generated in significant amounts in the cell. As the oxygen is reduced and hence recombined at the negative, it discharges the negative active material in an amount electrochemically equivalent to the amount of oxygen recombined. Because oxygen is generated as early as 85% return to charge, the negative should never be allowed to approach a state of recharge high enough for hydrogen to begin to evolve.

The cell can sustain oxygen recombination at rates equivalent to the typical finishing charge rate of chargers used to recharge batteries used in repetitive deep cycle applications. Substantially all of the oxygen recombines (viz.—oxygen recombination efficiencies of 98% or higher should be achieved; substantially no hydrogen should be evolved, and hence, any water loss is minimal. The invention therefore provides a totally maintenance-free, deep-cycle, lead-acid battery that can recharge in less than 10-12 hours, typically less than 8 hours, down to about 6½ hours or so. For example, cells made in accordance with the invention can typically be recharged, after a 100% depth discharge (to 1.7 volts) at a rate of C/5, and recharged to a 110% return of charge in less than 9 hours. The cycle life of the cell is relatively insensitive to charging voltage over the range typically used in deep cycle recharging, i.e., 2.45 to 2.55 v.

We claim:

1. A maintenance-free, absorbed electrolyte, lead-acid cell capable of enduring deep discharge and rapid recharge cycling, with long cycle life, comprising:
a container normally sealed from the atmosphere in service;
a plurality of positive plates in said container, each of said plates comprising a self-supporting grid of a lead alloy containing no more than about 2% antimony based upon the total weight of the alloy, and positive active material on said grid;
a plurality of negative plates in said container, each of said plates comprising a self-supporting grid of essentially antimony-free lead alloy and negative active material pasted on said grid;
sulfuric acid electrolyte in an amount sufficient to provide a desired capacity and an electrolyte-starved condition;
separator material intimately contacting and separating said positive and negative plates, said separator material being at least 70% porous, easily wetted, and capable of wicking the electrolyte;
said electrolyte being substantially completely absorbed in said plates and separators; and
said separators providing a sufficient void volume in service to permit transport of oxygen gas generated during recharge at a sufficient rate so that pressure in the cell does not normally exceed about 10 psig.

2. A lead-acid cell as claimed in claim 1 in which the container has a normally closed safety release valve capable of venting gases from the container to the atmosphere before pressure within the container exceeds a predetermined level not greater than 10 psig.

3. A lead-acid cell as claimed in claim 1 in which the cell capacity exceeds 25 AH.

4. A lead-acid cell as claimed in claim 1 in which the separator material is between about 75 and 95% porous.

5. A lead-acid cell as claimed in claim 1 in which the separator material is about 90% saturated with the electrolyte.

6. A cell as claimed in claim 1 wherein the grids of the positive are of a lead alloy containing antimony in an amount of about 0.5 to 2.0 and cadmium in an amount of about 0.5 to 2.0, both percentages being based upon the total weight of the alloy.

7. A cell as claimed in claim 6 wherein the grids of the positive are of a lead alloy containing antimony in an amount of about 1.2–1.8% and cadmium in an amount of about 1.2–1.8%, both percentages being based on the total weight of the alloy.

8. A cell as claimed in claim 1 wherein the active materials are formed from pastes essentially free of tetrabasic lead sulfate.

9. A cell as claimed in claim 1 wherein the negative active material has a density of from about 3.6 to 4.1 grams/cm.$^3$.

10. A cell as claimed in claim 1 wherein the separator is a borosilicate glass material.

11. A battery comprising a plurality of cells according to claim 1.

12. A maintenance-free, sealed, absorbed electrolyte, lead-acid cell capable of enduring repeated deep discharge cyclic regimes, comprising:
a container normally sealed from the atmosphere in service;
a plurality of positive plates in said container, each of said plates comprising a self-supporting grid of a lead alloy containing no more than about 2% antimony based upon the total weight of the alloy, and positive active material pasted on said grid; a plurality of negative plates in said container, each of said plates comprising a self-supporting grid of essentially antimony-free lead alloy and negative active material pasted on said grid;
an electrolyte absorbing and retaining separator material intimately contacting and separating said positive and negative plates said separator material having sufficient void space so that the oxygen diffusion rate at equilibrium approximately equals the rate at which oxygen is evolved;
sulfuric acid electrolyte absorbed in said plates and separators, said plates and separators being sufficiently porous to retain sufficient electrolyte to provide a cell capacity of at least 25 ampere hours and an electrolyte-starved condition; and,
said container having a normally closed relief valve capable of venting gases from the container to the atmosphere when pressure within said container is no greater than about 10 psig.

* * * * *